(12) United States Patent
Norland et al.

(10) Patent No.: US 10,397,474 B2
(45) Date of Patent: Aug. 27, 2019

(54) SYSTEM AND METHOD FOR REMOTE MONITORING AT LEAST ONE OBSERVATION AREA

(71) Applicant: KONGSBERG DEFENCE & AEROSPACE AS, Kongsberg (NO)

(72) Inventors: Magne Norland, Skedsmokorset (NO); Kjell Arne Hellum, Skedsmokorset (NO); Jorn Are Henriksen, Langhus (NO); Jan Ove Larsen, Lillestrom (NO); Glenn Levi Nilssen, Oslo (NO); Roar Johnsen, Fjerdingby (NO); Steinar Lind, Nittedal (NO); Oyvind Overrein, Strommen (NO); Vegard Almas, Oslo (NO); Per Inge Jensen, Skjetten (NO); Claus Fritzner, Hagan (NO); Bjorn Olav Bakka, Oslo (NO); Eirik Joakim Steinli, Kongsberg (NO); Thor Christian Helgerud, Kongsberg (NO)

(73) Assignee: KONGSBERG DEFENCE & AEROSPASE AS, Kongsberg (NO)

( * ) Notice: Subject to any disclaimer, the term of this patent is extended or adjusted under 35 U.S.C. 154(b) by 213 days.

(21) Appl. No.: 15/316,305

(22) PCT Filed: Jun. 6, 2014

(86) PCT No.: PCT/EP2014/061873
§ 371 (c)(1),
(2) Date: Dec. 5, 2016

(87) PCT Pub. No.: WO2015/185161
PCT Pub. Date: Dec. 10, 2015

(65) Prior Publication Data
US 2017/0163888 A1  Jun. 8, 2017

(51) Int. Cl.
*H04N 5/232* (2006.01)
*H04N 5/247* (2006.01)
(Continued)

(52) U.S. Cl.
CPC .......... *H04N 5/23238* (2013.01); *H04N 5/04* (2013.01); *H04N 5/23206* (2013.01);
(Continued)

(58) Field of Classification Search
None
See application file for complete search history.

(56) References Cited

U.S. PATENT DOCUMENTS 5,790,183 A * 8/1998 Kerbyson .......... G08B 13/1963
174/86
7,880,769 B2 * 2/2011 Qi .......................... H04N 5/145
348/208.1
(Continued)

FOREIGN PATENT DOCUMENTS

JP  2010-213249 A  9/2010
JP  2012-129673 A  7/2012
(Continued)

OTHER PUBLICATIONS

International Search Report, dated Feb. 25, 2015, from corresponding PCT application.

*Primary Examiner* — Christopher Braniff
(74) *Attorney, Agent, or Firm* — Young & Thompson

(57) ABSTRACT

System and method for remote monitoring of at least one observation area, including at least one first camera 110 arranged on a rotating platform 120, the first camera 110 is a line scanning camera for providing high definition panorama pictures of the observation area; at least one second camera 130 arranged on a stationary platform 140, the second camera 130 is a video camera with Pan/Tilt/Zoom functionality for providing real time video from a selected scene within the observation area; an angular position sensor device for triggering the read-out of each line in the first line scanning camera for providing each pixel in the panorama image with a corresponding azimuth and elevation angle; a
(Continued)

processing device 150 connected to the first and second cameras 110, 130 for capturing, processing and coordinating azimuth and elevation signals received from the first and second cameras 110, 130.

26 Claims, 3 Drawing Sheets

(51) Int. Cl.
　　　*H04N 5/04*　　　(2006.01)
　　　*H04N 7/18*　　　(2006.01)
(52) U.S. Cl.
　　　CPC ..... *H04N 5/23264* (2013.01); *H04N 5/23293* (2013.01); *H04N 5/247* (2013.01); *H04N 7/181* (2013.01)

(56) References Cited

U.S. PATENT DOCUMENTS

| | | | |
|---|---|---|---|
| 8,928,735 B2* | 1/2015 | Junuzovic | G03B 15/05 348/46 |
| 2009/0195652 A1* | 8/2009 | Gal | B60R 1/00 348/148 |
| 2011/0310219 A1 | 12/2011 | Kim et al. | |
| 2012/0229596 A1* | 9/2012 | Rose | G06T 3/4038 348/36 |

FOREIGN PATENT DOCUMENTS

| | | |
|---|---|---|
| WO | 99/45511 A1 | 9/1999 |
| WO | 2012/046371 A1 | 4/2012 |

\* cited by examiner

SYSTEM AND METHOD FOR REMOTE MONITORING AT LEAST ONE OBSERVATION AREA

INTRODUCTION

The present invention comprises a system and a method for remote monitoring of at least one observation area, and more specifically a system and method for improved monitoring and situational awareness by combining and merging real time panorama images with real time video as well as real time information from different sensors.

BACKGROUND

Methods and systems for monitoring and detection of different incidents are well known. These comprise use of surveillance cameras for capturing visual information from an area to be monitored.

A surveillance camera is typically a panoramic camera for establishing an overview of a scene. This can be combined with a PTZ (Pan/Tilt/Zoom) camera for focusing on points of interest in the scene. Use of panoramic cameras based on line scanners as well as tilting controlled PTZ cameras is known.

U.S. Pat. No. 5,790,183 A describes a panoramic television surveillance system comprising a line scanner on a rotating platform for producing panoramic images. This will produce high definition panoramic pictures. The publication does however not describe features for zooming in on points of interest and for coordinating panorama pictures and zoomed in pictures.

US 2011/310219 A1 describes a monitoring system with a PTZ camera which is autonomously controlled by an algorithm detecting motion in scenes from a panorama camera. It does however not describe a flexible system with a separate panorama camera and PTZ camera enabling an operator to select a specific point of interest in a high definition panorama picture presenting the scene, and where this point is zoomed in and where each camera sends video and pictures independently to a control station where video and pictures can be processed and viewed separately or integrated. The solution described does further not comprise a high definition line scanner and does not allow a PTZ camera to automatically perform complex tasks like scanning a predefined route or jump between predefined positions.

Prior art systems for monitoring are not suited for monitoring large areas being displayed as high definition panoramic pictures for operators located at remote locations, and where an operator can select a point of interest from a panorama picture for zooming in and where the zoomed in part of the scene is merged with the appropriate part of panoramic picture.

Existing monitoring installations present information from different camera systems, recorded at different observation areas, on separate monitors in operation rooms. Normally this call for use of several operators or that one operator is moving the focus to the different monitoring for updating an overview of the situation.

There is a need for a method and system for monitoring an observation area by enabling an operator located at a remote location to zoom in on a selected part of a high definition panorama picture, as if the operator where standing in the field of the observation area using binoculars zooming in on a point of interest in the field of view. In order to provide such a method and system the exact pointing direction of the part of the panoramic picture that is zoomed in must be coordinated with the correct position in the zoomed in picture when producing a merged picture. A merged picture will thus show a panoramic overview picture of an area together with a zoomed in picture which is positioned in the area of the panoramic picture that is zoomed in. The zoomed in picture may for instance be video.

The present invention will simplify the daily routine for each operator substantially and the number of operators can thus in most cases be reduced. The invention enables use of and simultaneous access to accessible data from different camera systems and sensors from different operation areas from a remote operation centre. Data visualization and representation can thus be realized on only one monitoring device.

An operator can remotely operate both panorama camera and PTZ video camera in one or several observation areas from a distant location in a safe environment with respect to specific needs. This contributes significantly to increased quality and safety at the workplace of the operator.

The present invention comprises a system and a method for monitoring at least one observation area, and more specifically a system and method for improved monitoring and situational awareness by combining and merging real time panorama images with real time video as well as real time information from other sensors like range information and radar images, together with computer generated synthetic information like terrain models and object labels from the observation area that is to be monitored.

The invention is described by combining use of different camera technologies and sensors for capturing, processing and coordinating of signals from these and presenting these together with computer generated information.

The invention is realized in a flexible system for monitoring and controlling and it enables a realistic visual presentation of one or more observation areas even if available band width for transferring data with information is restricted.

The invention is flexible and comprises features not found in prior art. Examples of these are adjusting rotation speed of a rotating platform equipped with a line scanning camera that is providing a panorama pictures, and where this is done according to correct exposure, available band width etc. Another example is the incorporation of a laser range finder or radar, to obtain more details of the target and 3D laser scanner for providing 3D visualization of an observation area.

The present invention further comprises a monitoring and controlling station being used to display independent images from an observation area and presented simultaneously on the same display. Other information as terrain models, geo-tags (names, height, distance), and information from other sensor can also be presented.

The present invention is flexible and comprises features not found in prior art.

SHORT DESCRIPTION OF THE INVENTION

The present invention comprises a system for monitoring at least one observation area. The system comprises at least one first camera arranged on a rotating platform which is a line scanning camera for providing high definition panorama pictures of said observation area.

The system further comprises at least one second camera arranged on a stationary platform, said second camera is a video camera with PTZ functionality for providing real time video from a selected scene within said observation area.

The system further comprises an angular position sensor device for triggering the read-out of each line in said first line scanning camera for providing each pixel in the panorama image with a corresponding azimuth and elevation angle.

The system further comprises a processing device connected to said first and second cameras for capturing, processing and coordinating azimuth and elevation signals received from said first and second cameras.

Further features of the system are described in the dependent claims.

The present invention further comprises a method for monitoring at least one observation area by arranging at least one first camera on a rotating platform, said first camera is a line scanning camera for providing high definition panorama pictures of said observation area. The method further comprises arranging at least one second camera on stationary platform, said second camera is a video camera with PTZ functionality for providing real time video from a selected scene within said observation area.

The method further comprises providing angular position of said first line scanning camera, by means of an angular position sensor device, for providing each pixel in the panorama image with a corresponding azimuth and elevation angle.

The method further comprises processing and coordinating azimuth and elevation signals from said first and second cameras by means of a processing device.

Further features of the method are described in the dependent claims.

DETAILED DESCRIPTION OF THE INVENTION

The invention will now be described in detail with reference to figures where:

The present invention has been made in order to replace a local human at an observation area with an Out-of-Tower-View (OTW) overview and access to binoculars with another human located at a remote location with access to a panoramic image on a Head-Up-Display (HUD) and having access to a PTZ-camera control device with the ability to merge the PTZ-image with the panoramic image at the HUD. A human at the remote location will see the same details, or at least details to any level specified, as a human with OTW at the observation area.

In addition to image information, additional information can be retrieved from sensors at the local site where the cameras are located and from computer systems. This additional information can be processed and presented on the HUD to improve situational awareness and to provide a superior working position at a remote location.

The present invention solves the problem of monitoring, controlling and coordinating both panorama cameras and PTZ cameras by utilizing a rotating platform for the panorama cameras and a stationary platform for the PTZ cameras.

Figure 1:
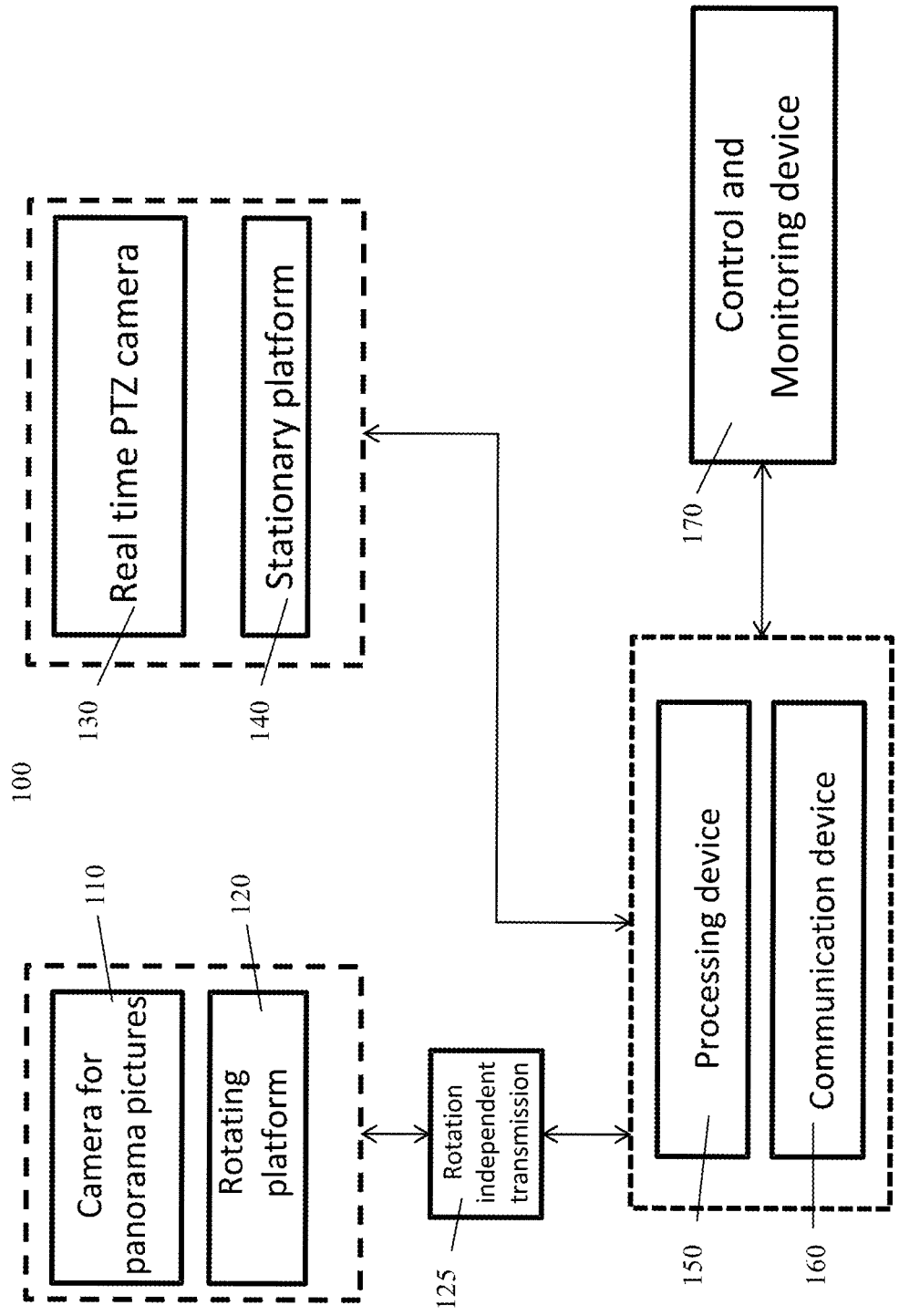
FIG. 1 shows an overview of the system comprised in the invention.

FIG. 1 shows an overview of the components comprised in the system 100 for remote monitoring of at least one observation area. The system can be described as a hybrid monitoring system since it comprises different camera solutions where one type of cameras is arranged on a rotating platform 120, while another type of cameras is arranged on a stationary platform 140. Data from the different cameras is captured, processed and coordinated by means of a processing device 150.

For simplicity, use of only one camera placed on each of a rotating and stationary platform 120, 140 respectively is described in the following. One observation area is further described even if the system 100 can handle several observation areas.

The inventive system for remote monitoring of at least one observation area, comprises at least one first camera 110 arranged on a rotating platform 120, said first camera 110 is a line scanning camera for providing high definition panorama pictures of said observation area. Signals to and from the first camera that is arranged on the rotating platform can be transferred by means of a rotation independent transmission device 125.

The system further comprises at least one second camera 130 arranged on a stationary platform 140, said second camera 130 is a real time video camera with PTZ functionality for providing video from a selected scene within said observation area. PTZ functionality means that direction and segment/detail of real time video to be displayed is controlled by PTZ instructions. For giving this function to the camera the stationary platform can be made of a two-axis platform that is controlled with PTZ instructions for giving a camera that is mounted onto it said pan-tilt function. Alternatively the camera house itself that is used may have these functions built-in. The camera is sending real time video of a segment of the said 360-degrees panoramic still picture that is active.

The system further comprises an angular position sensor device (not shown) for triggering the read-out of each line in said first line scanning camera 110 for providing each pixel in the panorama image with a corresponding azimuth and elevation angle.

The system further comprises a processing device 150 connected to said first and second cameras 110, 130 for capturing, processing and coordinating azimuth and elevation signals received from said first and second cameras 110, 130.

The processing device will enable compression of image data at the source prior to transmitting image data by means of a communication device 160 comprising transmitter and receiver. The communication device 160 further comprises means for providing redundant paths for signals and means for adopting communication bandwidth to the available bandwidth.

According to the invention the first camera 110 providing panorama pictures is a line scanning camera with corresponding optics and electronics mounted on the rotating platform 120. By performing a full rotation on the rotating platform 120 the camera will capture a 360-degrees panorama picture. Line scanning technology can provide uniform colour/black and white representation with high resolution corresponding to the human eye, i.e. 0.2-0.3 mrad, which is preferable in many areas of application of the invention.

Line scanners used in the system 100 can be of the same type or based on different technology and where these are mounted on the rotating platform with an angle distance depending of function. The rotating platform may further be tiltable for covering the full hemisphere in the observation area.

The picture sensor in a line scanner is a collection of vertical sensor strips collecting, for instance, but not restricted to, visual light, in spectral band (colour) and/or IR and/or UV. The cameras 110, 130 can have a picture sensor operating in visual spectral band (colour) and/or IR and/or UV.

Line scanning can also be realized as the sensor pixel matrix where vertical lines are sequentially integrated to improve the signal/noise ratio. The technique is called TDI (Time Delay Integration).

In one embodiment of the invention the at least one first camera 110 arranged on the rotating platform 120 is provided with TDI. By inserting a filter or a prism that is splitting the light into several spectral bands (i.e. colours) and having a TDI strip per spectral band each single spectral band can be detected. With this technique a colour camera for RGB having increased light sensitivity can easily be realized. This will in turn permit increased scanning rate.

A suitable combination of different line scanning sensor types will ensure the best possible awareness process and situation overview over an observation area both night and day as well as during conditions with reduced visibility as a result of for example fog or dust. A scene from an observation area can be reproduced in black/white or colour.

In a preferred embodiment of the invention, the system further comprises a control and monitoring device 170 for selective controlling and displaying of real time video from the at least one observation area and for operating the rotating platform 120 and the cameras 110, 130 at the at least one operation area. The control and monitoring device will provide for selective merging of panorama pictures and video from said first and second cameras 110, 130. The control and monitoring device is described in more detail below with reference to FIG. 2.

In one embodiment of the invention, the video signal from the PTZ camera is displayed in a dedicated display system or as a picture enclosed in said 360-degrees panoramic picture, i.e. with Picture-in-Picture functionality (PIP). The resolution of the PTZ camera used is preferably corresponding to the one the line scanning camera is operating with. If required, a larger part of the scene can be displayed with real time video at the cost of the resolution of the video camera. A PTZ camera can also comprise several staring cameras that are lined up between each other. In this way a larger sector of the panoramic picture can be presented as real time video without reducing resolution.

In one embodiment the system further comprises a range measuring device having an aiming axis parallel with an optical axis of the at least one second camera 130 that is providing real time video. The range to object of interest can then be found and displayed.

In one embodiment of the invention, the system further comprises sensors arranged on the stationary platform 140 for monitoring surrounding parameters. These may comprise microphones that are arranged on the stationary platform 140, and where these are connected to the processing device 150 such that the scene displayed from the area is based on direction of captured sound.

The cameras and the sensors can be placed in one or several observation areas and are adapted for operation in all environments such that they can tolerate different conditions with regards to, among other factors, temperature, wind, dust, rain, and other factors that may reduce the performance of the sensor collection.

Recorded sound from a scene can also be reproduced for an operator synchronous with the picture for increased realization of the situation. This signal is presented for the operator via a number of speakers 176 such that sound and picture from the scene is reproduced like it is at the recording site.

The system may further comprise a radar system arranged on said rotating and/or stationary platforms 120, 140. A radar system will make it possible to identity objects and their position and velocity when sight and visual information are bad. The radar system can also be mounted on a rotating part, where it is synchronized with the panoramic pictures.

The system 100 can further comprise sensors for monitoring different ambient parameters. Such types of sensors are arranged on the stationary platform 140.

Preferably the rotating platform 120 and/or the stationary platform 140 are provided with motion stabilization. The chassis used for the cameras in the observation area is preferably made of a type ensuring stability for generating stable pictures during dynamic conditions occurring in different operation areas. In one embodiment the chassis itself can be a stabilization platform that is connected to the rotating platform 120.

The rotating platform 120 comprises a positioning system ensuring reproduction of a complete panoramic picture for each rotation. The rotating platform 120 further comprises a rotation independent transmission 125 for sending and receiving signals. This can in one embodiment be in the shape of a contact or wireless collector ring for transferring data from the panoramic camera. Signals too and from the rotating platform also be sent wirelessly.

When the system 100 is operational it will generate large amounts of data that will have to be processed and handled before transmission to a location for remote monitoring. Processing of captured data can be executed in all elements in the assembly for reducing the amount of data where there is need for this.

The remote monitoring system is typically a control room which comprises a control- and monitoring device 170 for controlling of the monitoring system as well as means for displaying of data from cameras and sensors, i.e. panorama pictures and real time video from at least one observation area.

The panorama pictures displayed will be updated in line with the rotation speed of the rotating platform 120. New information can be displayed either line wise or section wise as new information is captured, or down to one time for each lap where a complete new panorama picture is displayed for the operator 180.

In one embodiment, the system 100 further comprises means for adapting rotation velocity of said rotating platform 120 according to available bandwidth. This is facilitated in that the rotating platform 120 uses synchronization pulses from a resolver on the rotating platform.

For transmitting monitoring data the system 100 further comprises a communication device 160 connected to the processing device 150 such that processed and coordinated signals are transferred to a location for remote controlling and monitoring of the at least one observation area.

The stationary platform further comprises at least one acoustic transducer for acoustic communication and/or at least one optical transducer for optical communication locally out to on-site workers. The transducers are coupled to the communication device for remote controlling from the system operators.

Processing of data and image processing may include, but is not restricted to, data compression and image differentiation. Reduction of the amount of data transmitted can be achieved by only sending new/changed information in succeeding pictures. The degree of compression may be adjusted to accessible band width.

Information is transmitted via a suitable communication medium as for instance, but not restricted to, dedicated lines (fiber, copper), wireless (Wi-Fi, Internet, optical) and where distance may be indefinite.

In one embodiment, the system 100 may also comprise signalling by using at least one acoustic and/or at least one optic transducer. The acoustic and/or optic transducer may be placed on the stationary platform 140 in line with the optical axis on the at least one second camera 130.

Figure 2:
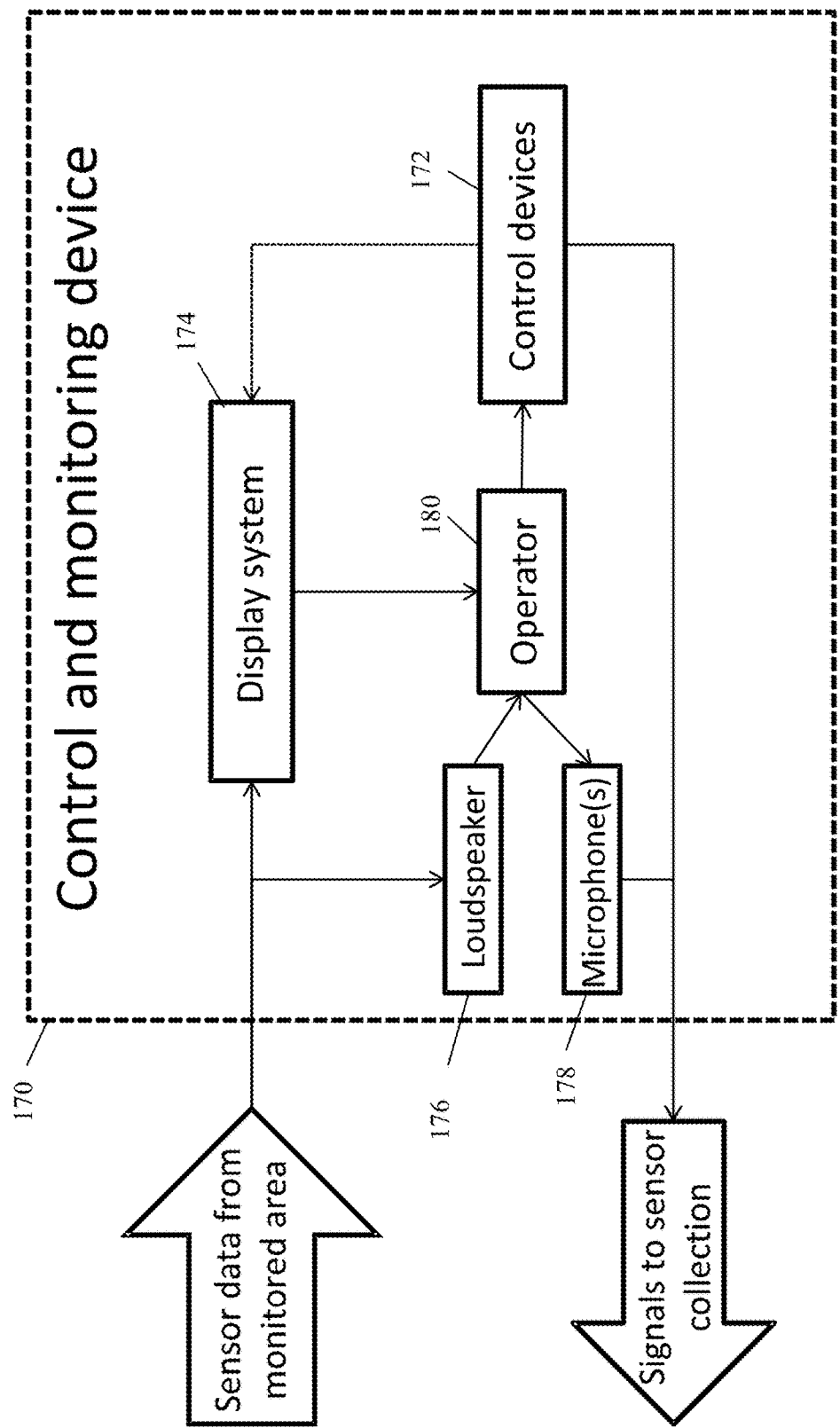
FIG. 2 shows details of the control- and monitoring device.

FIG. 2 shows details of the control and monitoring device 170 which preferably is located at a location where an operator 180 can control the system 100 in a safe environment. Data comprising sensor data and image data from the monitored observation area are input data to the control and monitoring device 170, while control signals from the control and monitoring device 170 are output signals that are fed to the communication and processing devices 150, 160 that are connected to the rotating platform 120, cameras 110, 130, stationary platform 140, acoustic and optical transducers.

The system 100 is equipped with a display system 174 for displaying the observation area. This can be presented as a 360-degree picture, with a resolution up to, but not restricted to said resolution of the eye. If smaller sectors are displayed one may pan in the still picture via a user interface. The display system 174 may comprise, but is not limited to variations of monitors, projectors for front or back projection, OLED wallpaper, display glasses, a helmet mounted display or a combination of these. For a more realistic presentation, the presentation of the picture is a curve shaped seamless screen or display surrounding an operator.

The part of the scene that is displayed in real-time video is defined by the operator 180 via commands given via a user interface and control devices 172. Control devices 172 may be, but is not restricted to, hand gestures, control grip, head and/or eye position tracking, a touch sensitive screen, and/or virtual binocular, verbal commands, a combination of all said control devices and other known controlling means.

An example of the last mentioned can be a hand held device with a pointing function and integrated displays together with zoom/focus adjustment. When an operator 180 finds an object of interest in the field of view of a PTZ-camera the object can be tracked automatically by the said PTZ-camera, and if displaying is performed in real-time the zoomed in picture displayed in and merged with the panorama picture will move with the tracked object of interest relative to the panorama picture. If several PTZ-cameras are accessible more objects can be tracked at the same time in real-time. The operator 180 also has the possibility to control the PTZ-camera to follow a predetermined track.

By using a standardized user interface an operator 180 can easily operate monitoring of several remote located observation areas.

In order to increase the performance of the line scanning camera(s) on the rotating platform further image processing is performed for making the use easier, increase the observability or making the picture as identical as a real scene as possible. Examples of image processing are improvements of contrast and colour, target detection, recognition, identification and tracking.

In addition to picture-in-picture functionality the system 100 may display other information as an overlay, in dedicated windows, or on dedicated display systems. Examples of information can be temperature and weather data, information captured by dedicated sensors mounted on the platform. Radar information may also be integrated with the panorama picture or presented on a dedicated display system. The system 100 may also comprise an adapted radar system, such as for instance a Doppler radar, or utilization of existing, available radar systems. Information about known stationary or movable elements in the scene can also be included in the display system.

Captured sound signal from the microphones located at the observation area(s) can be presented for the operator 180 via a number of loudspeakers 176 such that sound and picture from the observation area is recreated.

In addition to video and still pictures the system 100 can perform continuous range measurements from the position of the system 100 to an object of interest. The distance is presented on the display system 174 in a desired denotation as overlay or in dedicated windows.

By providing a laser system a 3D-range picture of the scene can be generated. In one embodiment of the invention there is therefore, in parallel with the line scanning camera, a rotating laser emitting and receiving sensor system generating a 3D-range picture of the area to be monitored.

Figure 3:
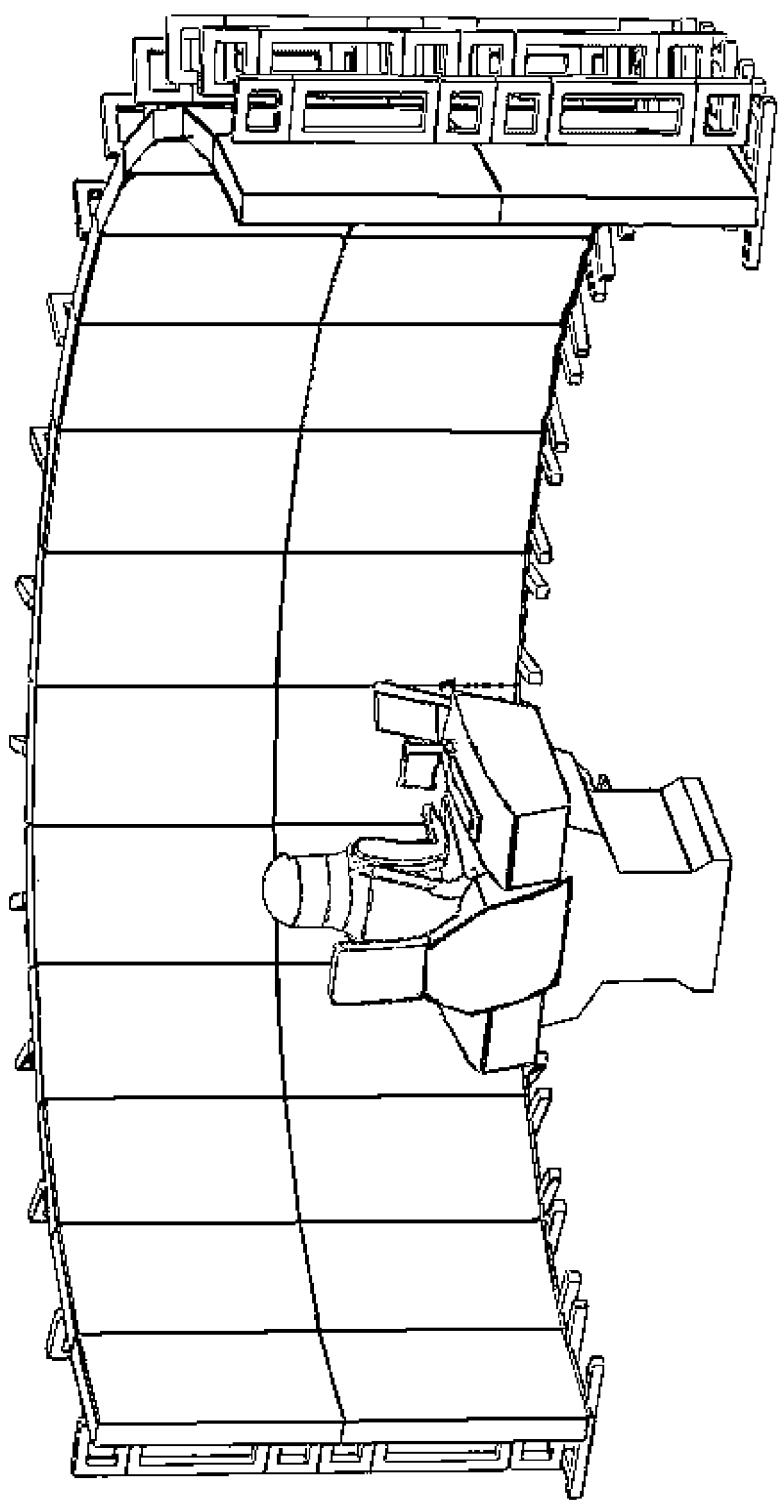
FIG. 3 shows an example of a location where monitoring can be controlled.

FIG. 3 shows an example of a control centre from where monitoring and controlling can be performed. In the figure a plurality of displays or monitors are connected in a curved configuration in front of an operator 180 such that the observation area that is monitored cover the complete field of view of the operator 180. The figure shows a visual angle of about 180°, but by expanding this with more monitors 360° can be realized.

In another embodiment the visual information from an observation area can be displayed for an operator 180 that is equipped with a helmet with a mounted display or that is using display glasses.

Displaying of one or more observation areas can also be realized on a screen or similar by using front- or back projection.

3D-presentation can also be realized if 3D-pictures of the scene to be monitored are generated at the observation area. If two or more sensor assemblies are connected to the same display system, two and two signals can be displayed with different polarization (similar technology as 3D-glasses) where two operators 180 have glasses and headsets that are filtering out one polarization. In this way two operators 180 can monitor two sites at the same time from the same control room, without loss of field of view, resolution or observation ability. By using lower resolution or field of view two observation areas can be presented for one operator 180 on the same display system, with pictures either above or beside each other.

An operator 180 will be able to control information that is selected to be displayed for further inspection and viewing by means of the said different control devices 172.

What is to be displayed in real time video by means of the said at least one other camera 130 located in the observation area can in one embodiment of the invention be controlled totally automatically based on interpretation of detected movements, sound and light from the observation area. An operator 180 can however override one or more of these and may perform a manually control of the whole system based on own sight- and aural impressions.

The present invention which is described above as the system 100 also comprises a method for monitoring at least one observation area.

The inventive method comprises several steps, where the first step is arranging at least one first camera 110 on a rotating platform 120, said first camera 110 is a line scanning camera for providing high definition panorama pictures of said observation area.

The next step is arranging at least one second camera 130 on stationary platform 140, said second camera 130 is a video camera with PTZ functionality for providing real time video from a selected scene within said observation area.

The next step is providing angular position of said first line scanning camera 110, by means of an angular position sensor device, for providing each pixel in the panorama image with a corresponding azimuth and elevation angle.

The last step is processing and coordinating azimuth and elevation signals from said first and second cameras 110, 130 by means of a processing device 150.

The processed coordinated signals are preferably transferred to a location for controlling and monitoring of the at least one observation area by means of a communication device 160 connected to said processing device 150.

The resulting live images produced from said second camera 130 will be presented as a Picture in Picture (PIP), i.e. as a video picture in the panorama picture with precise angular pointing direction in the panorama pictures of the observation area to be monitored.

In a preferred embodiment of the invention, the method further comprises the step of adapting rotation velocity of the rotating platform 120 according to available data transfer bandwidth of the rotation independent transmission device 125. This is facilitated in that the rotating platform 120 uses synchronization pulses from a resolver on the rotating platform. This will ensure that the size and high resolution of the panorama pictures from the at least one first camera 110 remain the same even if platform rotational speed is time varying. Said processing device 150 connected to the cameras 110, 130 will control this operation. Available data transfer bandwidth can be configurable by the communication device 160 according to e.g. time of day, time of year for correct exposure and lifetime considerations (degrading).

At the control room comprising the control and monitoring device 170 a paramount objective of the invention is to present an overview panoramic picture from the observation area with same high quality resolution regardless of light conditions etc. at the observation area, while a merged PTZ picture can have a different resolution and refresh rates depending on how the PTZ camera is operated, e.g. zoom factor and fast or slow movements across the field of view.

Coordinated position of at least one PTZ picture that is merged in a panoramic picture displayed on the display system 174 in a control room can be controlled automatically in real-time, or the position of the PTZ picture can be chosen manually by an operator.

According to one embodiment of the invention, the at least one first camera 110 on the rotating platform 120 is using TDI as described in the description of the system above.

By providing and arranging a range measuring device having an aiming axis parallel with the optical axis of the at least one second camera 130, an operator will be provided with range information to selected objects.

Different types of sensors can be arranged on the stationary platform 140 for monitoring surrounding parameters, e.g. sound. Microphones can then be arranged on the stationary platform 140, and where these are connected to said processing device 150 such that a scene recorded can be based on the direction of captured sound and the captured sound and scene can be played for an operator operating the system 100 from a remote location.

A radar system can also be arranged on the rotating and/or stationary platform 120, 140. This will provide information about stationary or movable elements in the scene.

For avoiding or at least reducing vibrations, the rotating platform 120 and/or the stationary platform 140 is provided with motion stabilization.

The observation area monitored can in one embodiment of the invention be represented as a real-time 3D-model by providing a laser system that is mounted in parallel with the said at least one first camera 110 for generating a 3D-range picture of the area monitored.

When the inventive system 100 is operated by an operator 180 located remotely from the observation area, selective controlling and displaying of real time video from the at least one observation area can be performed, and as well as operation of said rotating platform 120 and cameras 110, 130 at the at least one observation area for selective merging of panorama pictures and video by using the control- and monitoring device 170 and the display system.

The present invention will make it possible to replace and centralize several different types of monitoring, controlling, observation, searching, simulating and practicing both at sea, in the air and onshore, for both civil and military use.

Examples of areas of application at sea are oil platforms and ship mounted implementations. The last mentioned may be a cruise ship, pipe lay vessel, ice breaker and similar.

Areas of applications in air may for instance be implementations of the invention in a helicopter and drones or unmanned aircrafts, whereas onshore it may be in connection with air traffic control, anti-terror, border areas, monitoring of harbors, and monitoring of scrap heap.

The invention is also well suited for being implemented in connection with a video conference or tourism as for instance a 'World Wide Virtual Tourist Center' or other areas of applications where presence at a distant location is desirable.

The invention claimed is:

1. A system (100) for remote monitoring of at least one observation area, comprising at least one first camera (110) arranged on a rotating platform (120), said first camera (110) is a line scanning camera for providing high definition panorama pictures of said observation area, the system further comprising:
    at least one second camera (130) arranged on a stationary platform (140), said second camera (130) is a video camera with Pan/Tilt/Zoom (PTZ) functionality for providing real time video from a selected scene within said observation area;
    an angular position sensor device arranged for triggering the read-out of each line in said first line scanning camera (110) for providing each pixel in the panorama image with a corresponding azimuth and elevation angle, and for providing synchronization pulses enabling adaption of rotation velocity of the rotating platform, and
    a processing device (150) connected to the angular position sensor and said first and second cameras (110, 130) for capturing and processing video and images and coordinating azimuth and elevation signals received from said first and second cameras (110, 130).

2. The system (100) according to claim 1, further comprising a control and monitoring device (170) for adapting rotation velocity of said rotating platform (120) according to available bandwidth.

3. The system (100) according to claim 1, wherein the at least one first camera (110) arranged on the rotating platform (120) is provided with TDI (Time Delay Integration).

4. The system (100) according to claim 1, wherein the cameras (110, 130) have a picture sensor operating in visual spectral band (colour) and/or IR and/or UV.

5. The system (100) according to claim 1, further comprising a communication device (160) connected to said processing device (150) for transferring processed coordinated signals to a location for controlling and monitoring of the at least one observation area.

6. The system (100) according to claim 5, wherein the communication device (160) comprises at least one acoustic and/or optical transducer for signalling and which is arranged on the stationary platform (140), or in line with the optical axis of the second camera (130) for local remote communication.

7. The system (100) according to claim 1, further comprising a range measuring device having an aiming axis parallel with an optical axis of the at least one second camera (130).

8. The system (100) according to claim 1, further comprising sensors arranged on the stationary platform (140) for monitoring surrounding parameters.

9. The system (100) according to claim 8, further comprising microphones arranged on the stationary platform (140), and where these are connected to said processing device (150) such that the scene displayed from the area is based on the direction of captured sound.

10. The system (100) according to claim 8, further comprising a radar system arranged on said rotating and/or stationary platform (120, 140).

11. The system (100) according to claim 1, wherein the rotating platform (120) and/or the stationary platform (140) is provided with motion stabilization.

12. The system (100) according to claim 1, wherein in parallel with the at least one first camera (110) there is a laser system generating a 3D-range picture of the area monitored.

13. The system (100) according to claim 1, further comprising a control- and monitoring device (170) for selective controlling and displaying of real time video from the at least one observation area and for operating the rotating platform (120) and the cameras (110, 130) at the at least one operation area, and for selective merging of panorama pictures and video from said first and second cameras (110, 130).

14. A method for monitoring at least one observation area by arranging at least one first camera (110) on a rotating platform (120), said first camera (110) is a line scanning camera for providing high definition panorama pictures of said observation area, the method comprising:
arranging at least one second camera (130) on stationary platform (140), said second camera (130) is a video camera with Pan/Tilt/Zoom (PTZ) functionality for providing real time video from a selected scene within said observation area;
providing angular position of said first line scanning camera (110) by means of an angular position sensor device, arranged for triggering the read-out of each line in said first line scanning camera (110), for providing each pixel in the panorama image with a corresponding azimuth and elevation angle, and for providing synchronization pulses enabling adaption of rotation velocity of the rotating platform, and
capturing and processing video and images and coordinating azimuth and elevation signals from said first and second cameras (110, 130) by means of a processing device (150) connected to the angular position sensor and said first and second cameras (110, 130).

15. The method according to claim 14, which comprises adapting rotation velocity of said rotating platform (120) according to available bandwidth.

16. The method according to claim 14, wherein the at least one first camera (110) on the rotating platform (120) is using Time Delay Integration (TDI).

17. The method according to claim 14, which comprises providing panoramic pictures and live video in the visual spectral band (colour), and/or IR and/or UV.

18. The method according to claim 14, which comprises transferring processed coordinated signals to a location for controlling and monitoring of the at least one observation area by means of a communication device (160) connected to said processing device (150).

19. The method according to claim 14, which comprises providing acoustic and/or optical communication locally at the observation area to on-site workers by means of acoustic and/or optical devices arranged on the stationary platform (140) and which are connected to the communication device (160).

20. The method according to claim 14, which comprises arranging a range measuring device having an aiming axis parallel with an optical axis of the at least one second camera (130).

21. The method according to claim 14, which comprises arranging sensors on the stationary platform (140) for monitoring surrounding parameters.

22. The method according to claim 14, which comprises arranging microphones on the stationary platform (140), and where these are connected to said processing device (150) such that scene displayed is based on the direction of captured sound.

23. The method according to claim 14, which comprises arranging a radar system on said rotating and/or stationary platform (120, 140).

24. The method according to claim 14, which comprises providing the rotating platform (120) and/or the stationary platform (140) with motion stabilization.

25. The method according to claim 14, which comprises generating a 3D-range picture of the area monitored by means of a laser system that is in parallel with the at least one first camera (110).

26. The method according to claim 14, which comprises selectively controlling and displaying of real time video from the at least one observation area, and operating said rotating platform (120) and cameras (110, 130) at the at least one observation area for selective merging of panorama pictures and video from said first and second cameras (110, 130) by means of a control- and monitoring device (170) and a display system (174).

* * * * *